US009511863B2

(12) United States Patent
Schneider et al.

(10) Patent No.: US 9,511,863 B2
(45) Date of Patent: Dec. 6, 2016

(54) SUPPORTING STRUCTURE FOR MOVEABLE BIN (71) Applicant: Airbus Operations GmbH, Hamburg (DE)

(72) Inventors: Uwe Schneider, Jork (DE); Andreas Jespersen, Buxtehude (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 187 days.

(21) Appl. No.: 14/160,966

(22) Filed: Jan. 22, 2014

(65) Prior Publication Data

US 2014/0152159 A1  Jun. 5, 2014

Related U.S. Application Data (63) Continuation of application No. PCT/EP2012/064599, filed on Jul. 25, 2012.
(Continued)

(30) Foreign Application Priority Data

Jul. 29, 2011  (DE) .................. 10 2011 108 895

(51) Int. Cl.
*B64C 1/20* (2006.01)
*B64D 11/00* (2006.01)
*A47B 46/00* (2006.01)

(52) U.S. Cl.
CPC ............ *B64D 11/003* (2013.01); *A47B 46/00* (2013.01); *Y02T 50/46* (2013.01)

(58) Field of Classification Search
CPC ............... B64D 11/00; B64D 11/003
(Continued)

(56) References Cited

U.S. PATENT DOCUMENTS 4,275,942 A * 6/1981 Steidl .................. B64D 11/003
                                                    16/66
4,368,937 A * 1/1983 Palombo ............. B64D 11/003
                                                    296/37.7
(Continued)

FOREIGN PATENT DOCUMENTS

CN  101119891 A  2/2008
CN  101506043 A  8/2009
(Continued)

OTHER PUBLICATIONS

European Searching Authority, European Search Report for PCTEP2012064599 Mailed Oct. 12, 2012.
(Continued)

*Primary Examiner* — Katherine Mitchell
*Assistant Examiner* — Johnnie A Shablack
(74) *Attorney, Agent, or Firm* — Lorenz & Kopf, LLP.

(57) ABSTRACT

A storage compartment for a passenger cabin of an aircraft is provided. The storage compartment comprises a storage compartment body, a mounting, a fixing brace and a pull rod. The fixing brace is connected to a frame of the primary structure of an aircraft and to the mounting and takes up forces transversely to the direction of flight. The pull rod is connected to a stringer of the aircraft primary structure and also to the mounting and takes up forces in the direction of flight in such a way that even in the event of an impact event, only low torques are to be taken up by the supporting primary structure of the aircraft.

10 Claims, 5 Drawing Sheets

Related U.S. Application Data (60) Provisional application No. 61/513,289, filed on Jul. 29, 2011.

(58) Field of Classification Search
USPC .................. 244/118.5, 118.1; 312/245–248
See application file for complete search history.

(56) References Cited

U.S. PATENT DOCUMENTS

| | | | | |
|---|---|---|---|---|
| 5,085,382 A * | 2/1992 | Finkenbeiner | ............ | B64C 1/10 188/371 |
| 5,108,048 A | 4/1992 | Chang | | |
| 5,725,293 A * | 3/1998 | Wilkening | ................ | E04H 6/42 211/116 |
| 5,820,076 A * | 10/1998 | Schumacher | ........ | B64D 11/003 244/118.5 |
| 5,839,694 A * | 11/1998 | Bargull | ................ | B64D 11/003 244/118.1 |
| 5,842,668 A * | 12/1998 | Spencer | ............... | B64D 11/003 244/118.1 |
| 5,934,615 A * | 8/1999 | Treichler | ............. | B64D 11/003 244/118.5 |
| 6,007,024 A * | 12/1999 | Stephan | ............... | B64D 11/003 244/118.1 |
| 6,045,204 A * | 4/2000 | Frazier | ................. | B64D 11/003 16/370 |
| 6,290,175 B1 * | 9/2001 | Hart | ..................... | B64D 11/003 244/118.1 |
| 6,484,969 B2 * | 11/2002 | Sprenger | ............. | B64D 11/003 244/118.1 |
| 6,769,831 B2 * | 8/2004 | Aquino | ................ | B64D 11/003 244/118.1 |
| 6,883,753 B1 * | 4/2005 | Scown | ................. | B64D 11/003 244/118.1 |
| 7,097,138 B2 * | 8/2006 | Stephan | ............... | B61D 37/003 244/118.6 |
| 7,118,068 B2 * | 10/2006 | Graf | ..................... | B64D 11/003 244/118.5 |
| 7,128,295 B2 * | 10/2006 | Scown | ................. | B64D 11/003 16/266 |
| 7,258,406 B2 * | 8/2007 | Stephan | .................. | B60R 5/003 244/118.5 |
| 7,455,263 B2 * | 11/2008 | Lau | ........................ | B60Q 3/025 244/118.5 |
| 7,481,397 B2 * | 1/2009 | Steinbeck | ............ | B64D 11/003 244/118.5 |
| 7,527,221 B2 * | 5/2009 | Humfeldt | ................ | B64C 1/066 244/118.5 |
| 7,823,830 B2 * | 11/2010 | Feldkirchner | ........ | B64D 11/003 244/118.1 |
| 7,832,685 B2 * | 11/2010 | Haynes | ................ | B64D 11/003 244/118.1 |
| 7,887,008 B2 * | 2/2011 | Lamoree | ............... | B64D 11/003 244/118.1 |
| 8,028,957 B2 * | 10/2011 | Wolf | .................... | B64D 11/003 244/118.5 |
| 8,317,132 B2 * | 11/2012 | Pein | ..................... | B64D 11/003 244/118.5 |
| 8,360,365 B2 | 1/2013 | Rahlff | | |
| 8,403,266 B2 * | 3/2013 | Fokken | .................. | B61D 17/18 244/131 |
| 8,430,358 B2 | 4/2013 | Schneider et al. | | |
| 8,517,308 B2 | 8/2013 | Schneider et al. | | |
| 8,622,344 B2 * | 1/2014 | Vine | .................... | B64D 11/003 244/118.5 |
| 8,678,528 B2 * | 3/2014 | Domenig | ........... | A47B 88/0477 312/319.1 |
| 8,733,699 B2 * | 5/2014 | Rafler | .................. | B61D 37/003 244/118.1 |
| 8,770,515 B1 * | 7/2014 | Cloud | .................... | G05G 17/00 244/118.5 |
| 8,770,516 B2 * | 7/2014 | Rafler | .................. | B64D 11/003 244/118.5 |
| 8,783,609 B2 * | 7/2014 | Schneider | ............ | B64D 11/003 244/118.1 |
| 8,833,698 B2 * | 9/2014 | Rafler | .................. | B61D 37/003 244/118.5 |
| 8,844,867 B2 * | 9/2014 | Graf | ..................... | B64D 11/003 244/118.5 |
| 8,882,383 B2 * | 11/2014 | Winkler | ............. | B64D 11/0007 244/118.1 |
| 9,033,279 B2 * | 5/2015 | Graf | ..................... | B64D 11/003 244/118.5 |
| 9,051,051 B1 * | 6/2015 | Biedscheid | ............ | B64D 11/00 |
| 9,242,731 B2 * | 1/2016 | Schneider | ............ | B64D 11/003 |
| 2003/0080247 A1 * | 5/2003 | Frazier | ................. | B64D 11/003 244/118.1 |
| 2004/0140398 A1 | 7/2004 | Lau et al. | | |
| 2007/0095980 A1 * | 5/2007 | Bock | .................... | B64D 11/003 244/118.1 |
| 2008/0055836 A1 * | 3/2008 | Lamoree | ............... | B64D 11/003 361/837 |
| 2008/0078870 A1 * | 4/2008 | Kneller | ................ | B64D 11/003 244/118.5 |
| 2008/0078871 A1 | 4/2008 | Munson et al. | | |
| 2008/0277527 A1 * | 11/2008 | Fokken | .................. | B61D 17/18 244/118.1 |
| 2009/0026318 A1 | 1/2009 | Gross et al. | | |
| 2011/0186681 A1 | 8/2011 | Vine et al. | | |
| 2011/0192935 A1 | 8/2011 | Schneider et al. | | |
| 2011/0253837 A1 * | 10/2011 | Lee | ...................... | B64D 11/003 244/118.5 |
| 2013/0026293 A1 | 1/2013 | Schneider et al. | | |
| 2013/0200213 A1 * | 8/2013 | Umlauft | ................ | B64C 1/066 244/129.1 |
| 2014/0152159 A1 * | 6/2014 | Schneider | ............ | B64D 11/003 312/248 |
| 2014/0209740 A1 * | 7/2014 | Guering | ................ | B64D 43/00 244/118.5 |
| 2014/0326829 A1 * | 11/2014 | Ehlers | ................ | B64D 11/0691 244/118.6 |
| 2014/0332628 A1 * | 11/2014 | Schneider | ................ | B60R 5/00 244/118.5 |
| 2015/0090838 A1 * | 4/2015 | Schmitz | ............... | B64D 11/003 244/118.5 |
| 2015/0166179 A1 * | 6/2015 | Moje | ................... | B64D 11/003 244/118.5 |
| 2015/0226243 A1 * | 8/2015 | Schneider | ................ | B64C 1/00 244/131 |

FOREIGN PATENT DOCUMENTS

| | | |
|---|---|---|
| DE | 10 2009 029 120 A1 | 3/2011 |
| WO | 2010037637 A2 | 4/2010 |
| WO | 2011051149 A2 | 5/2011 |

OTHER PUBLICATIONS

German Patent Office, Office Action for DE102011108895.8. Mailed May 9, 2012.

State Intellectual Property Office of the Peoples' Republic of China, Office Action for Chinese Patent Application No. 2015012901080630 mailed Feb. 3, 2015.

* cited by examiner

SUPPORTING STRUCTURE FOR MOVEABLE BIN

CROSS-REFERENCE TO RELATED APPLICATIONS

This is a continuation of International Application No. PCT/EP2012/064599, filed Jul. 25, 2012, which claims priority to German Patent Application No. 10 2011 108 895.8, filed Jul. 29, 2011, and to U.S. Provisional Application No. 61/513,289, filed Jul. 29, 2011, which are each incorporated herein by reference in their entirety.

TECHNICAL FIELD

This application pertains to a movable storage compartment for a passenger cabin of an aircraft, for example. In particular, the technical field relates to a supporting structure for a movable storage compartment which is of a lightweight construction. The technical field also relates to the use of a storage compartment of said type in an aircraft.

BACKGROUND

There are currently two different luggage compartment systems for aircraft cabins. There are non-movable luggage compartments (fixed bins) in the form of a storage compartment provided with a shutter towards the passengers. Alternatively, there are pivotable luggage compartments (movable bins) in the form of a storage compartment without a shutter which can be pivoted towards the passengers. All luggage compartments, the loading edge of which can be moved in some way, are known as "movable bins". A fundamental aspect of a movable storage compartment is that the open loading position differs from the closed position.

The component of a movable luggage storage compartment fixed to the fuselage is the housing and serves, inter alia, to receive the bin/storage container body itself. Here, it is possible to dispense with a shutter because the storage compartment becomes a closed box when pushed into the housing. The main advantage of movable storage compartments is the changeable position thereof; when closed, they provide a greater sense of space and in the lowered, open position, they can be loaded and emptied comfortably.

The primary structure of the aircraft and the housing are connected by connecting rods which are fixed between the aircraft-side fittings and the housing-side fittings. The housing and the storage compartment are directly connected by pivot bearings or roller-guided rail systems, it being possible for the housing and storage compartment to be connected together to form a pre-installed module.

An example of a movable bin which is pre-installed in a housing box as a storage compartment module is disclosed in DE 10 2007 030331 A1 and in WO 2009/003945 A1.

Other objects, desirable features and characteristics will become apparent from the subsequent summary and detailed description, and the appended claims, taken in conjunction with the accompanying drawings and this background.

SUMMARY

According to various embodiments, provided is a secure and lightweight storage compartment.

A storage compartment according to an exemplary embodiment of the present disclosure generally comprises a body, a fixing brace and a mounting i.e., a bearing, for example between the storage compartment body and the fixing brace. The storage compartment body can be formed as a box which is open on one side. The fixing brace can be fixed to a primary structure of the aircraft. For said purpose, the fixing brace can comprise a correspondingly shaped load application end. A primary structure of an aircraft often comprises an outer skin which is reinforced by frames (also called formers in the following) and stringers. In such a case, the fixing brace may be secured to one of the frames.

It should be noted that the fixing brace may take the form of a rod, trapezium or a planar shape. Furthermore, the fixing brace may be a combination of a plurality of fixing braces which form a framework which is particularly suitable for taking up the forces which arise transversely to the direction of flight.

The fixing brace also comprises a mounting end for receiving a mounting, the storage compartment body being arranged on the mounting end of the fixing brace in such a way that the storage compartment body can be pivoted about at least one pivot axis.

According to an embodiment of the present disclosure, the mounting comprises a fixed bearing on the storage compartment body at the front in the direction of flight. The mounting can also comprise a loose bearing on the storage compartment body at the back in the direction of flight.

Since the storage compartments in a passenger cabin of an aircraft are usually arranged transversely to the direction of flight, i.e. transversely to a longitudinal axis of the fuselage, the pivot axis of the storage compartment body is substantially parallel to the longitudinal direction of the passenger cabin in the fuselage, i.e. parallel to the direction of flight. The fixing brace will accordingly be arranged transversely to the longitudinal direction between a mounting point of the storage compartment body and, for example, a frame of the primary structure of the aircraft and will thus be able to take up the forces which act transversely to the direction of flight in particular.

The use of fixing braces means that it may be possible to dispense with a closed housing for receiving a storage compartment body. This may lead primarily to a reduction in weight.

The storage compartment according to an exemplary embodiment of the present disclosure may also comprise a pull rod as a stabilising element. The pull rod can be mounted between a stringer of an aircraft primary structure and the mounting in such a way that the pull rod can absorb forces in the direction of flight in particular.

According to one embodiment, the storage compartment can also comprise a panel as a stabilising element. The panel can also be fitted in such a way that it can take up forces in the direction of flight in particular. As a further function, the panel can cover the open side of the storage compartment body when the storage compartment body is in the closed position.

According to an embodiment of the present disclosure, a connecting element may be provided between the stabilising element and the mounting.

The connecting element can be formed as a brace which is arranged between the stabilising element and the mounting transversely to the direction of flight. Furthermore, the connecting element can be formed as an angle bracket comprising a transverse portion and a longitudinal portion, the transverse portion substantially extending outwards from the mounting transversely to the direction of flight and the longitudinal portion substantially extending outwards from the pull rod in the direction of flight. An angle bracket of said type may be formed in such a way that it is resistant to bending.

According to an embodiment of the present disclosure, the storage compartment further comprises a sliding block which is arranged adjacent to the outer edge of the storage compartment body. Said sliding block can be fixed to the connecting element in such a way that it is arranged at the front in the direction of flight opposite the lateral wall of the storage compartment, so that in an impact event, if the storage compartment body is pushed forwards, it is supported on the sliding block, as a result of which the forces acting in the direction of flight can be transmitted by the stabilising element onto a stringer, i.e. onto a longitudinal support. In an impact event, said measure can prevent the moments arising on the fixing brace from damaging the fixing brace and thus prevent the storage compartment from being separated from the primary structure of the aircraft. In turn, this reduces potential danger in an impact event.

The sliding block may be fixed to the connecting element or to the storage compartment body. Furthermore, the sliding block can be formed so as to be integral with the connecting element. The sliding block can be produced from a plastics material, for example polyamide, so that when the storage compartment body is pivoted between an open and a closed position, it can be easily moved along the sliding block by its lateral wall.

It is also possible for a gap to be provided between the sliding block and the storage compartment body so that the storage compartment body can be moved in a contact-free manner past the connecting element and the sliding block. In an impact event, a slight deformation of the connecting element may ensure that the storage compartment body rests against the sliding block and thus, in turn, the forces in the direction of flight would be diverted onto the aircraft primary structure by the sliding block.

The storage compartment may further comprise a lock, it being possible for the storage compartment body to be locked in a closed position by said lock. The main purpose of a lock of said type may be to prevent the storage compartment body from being opened accidentally. The lock can comprise, for example, a lock striker plate on a fixing brace, which striker plate can cooperate with a corresponding locking latch on the storage compartment body.

A damper may be provided which is arranged between the fixing brace and the storage compartment body to make actuating the storage compartment body more comfortable, i.e. when the storage compartment body is opened or closed. It should be noted that the damper can be a passive piston damper. Alternatively, the damper can also be an active member which on the one hand damps the speed of movement during opening and closing and on the other provides active power assistance for the actuation of the storage compartment body.

To further increase safety in an impact event, the fixing brace of the storage compartment may comprise an articulation point adjacent to the fixing end, said articulation point being formed in such a way that the fixing brace folds or is bent in the direction of flight as soon as a force acts on said brace in the direction of flight. An articulation point of said type can be formed as a hinge which does not transmit any forces in the direction of flight. However, the fixing brace can also be formed at the articulation point with a tapered cross-section, a type of film hinge, so that when a force arises in the direction of flight, a predetermined bending point is formed.

In said case, according to an embodiment of the invention, the transverse portion of the connecting element may replace at least part of the fixing brace and may thus be arranged between the fixing brace and the mounting. Furthermore, the stabilising element may be connected to the connecting element in the vicinity of the articulation point, so that forces arising in the direction of flight may be reliably absorbed.

These aspects described above may be implemented both in a storage compartment comprising a body which is pivotable about a defined axis, and also in a storage compartment with a body which can be moved along a guide rail in both a translational and rotational manner.

According to an embodiment of the invention, an aircraft comprises a storage compartment with the features described above and below. The aircraft may further comprise a covering panel which is arranged above the storage compartment in the passenger cabin of the aircraft. On its lower edge, the covering panel can comprise a portion which extends in the direction of the aircraft primary structure. Said portion of the covering panel which cannot be seen from the passenger cabin can be formed in such a way that when the storage compartment is closed, it forms a closed box together with said portion. Said measure may prevent items located in the storage compartment for example from catching behind the covering panel.

In addition, the primary structure of the aircraft with frames and stringers which is described and illustrated here is merely an example.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

The challenge of accommodating a movable storage compartment lies mainly in the limited installation space available for the movement mechanisms, and in the fact that the module weight is almost doubled due to the doubling of the sandwich surface area. A housing is usually a closed drawer with a contour open towards the passengers, and a storage compartment body is a smaller closed drawer with a contour open towards the passengers, inside the housing. Said double-walled construction method, including the necessary movement gaps and movement mechanisms, leads to a considerable loss of usable loading volume compared to fixed storage compartments (fixed bins) of the same size.

The same applies to the assembly weight, since the double-walled construction method, including the necessary movement mechanisms, may lead to considerable increase in weight compared to movable bins of the same size using conventional movement mechanisms.

The present disclosure now proposes abandoning the double-walled feature in a movable storage compartment (movable bin) and mounting the storage compartment body directly on the structure which, with an intelligent layout, means that a movable storage compartment may be achieved with the same weight and loading volume as a fixed bin.

It may thereby be possible for all the faces of a conventional storage compartment module which are visible to the passenger to be retained. It may further be possible for all the requirements placed on a conventional storage compartment module with regard to rapid and simple assembly to be satisfied. The requirements of load behaviour and reliability of a conventional storage compartment module are also satisfied, particularly in the event of an impact. Even the provision of passenger supply functions may remain unimpaired.

Thus, the loading volume of movable storage compartments with identical external dimensions may be increased, the weight may be considerably reduced, without passengers and manufacturers having to contend with any evident drawbacks.

Figure 1:
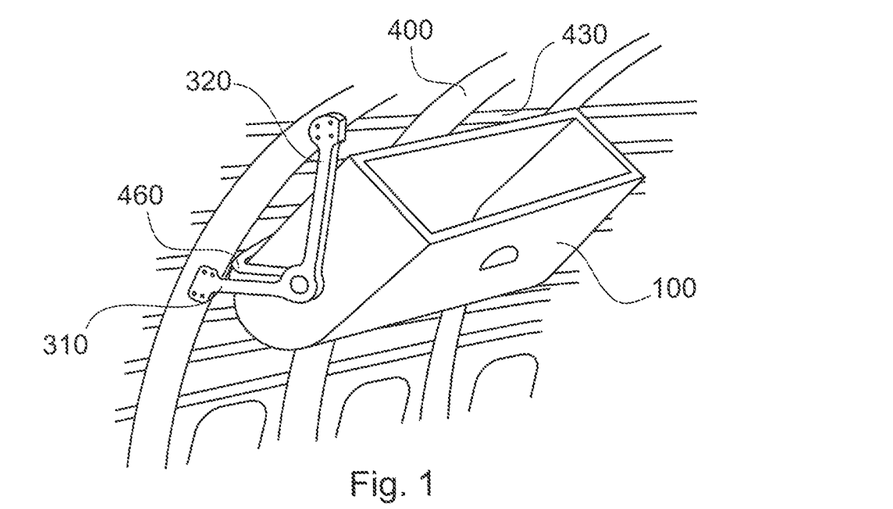
FIG. 1 is an isometric illustration of a storage compartment according to an exemplary embodiment of the present disclosure.
Figure 2:
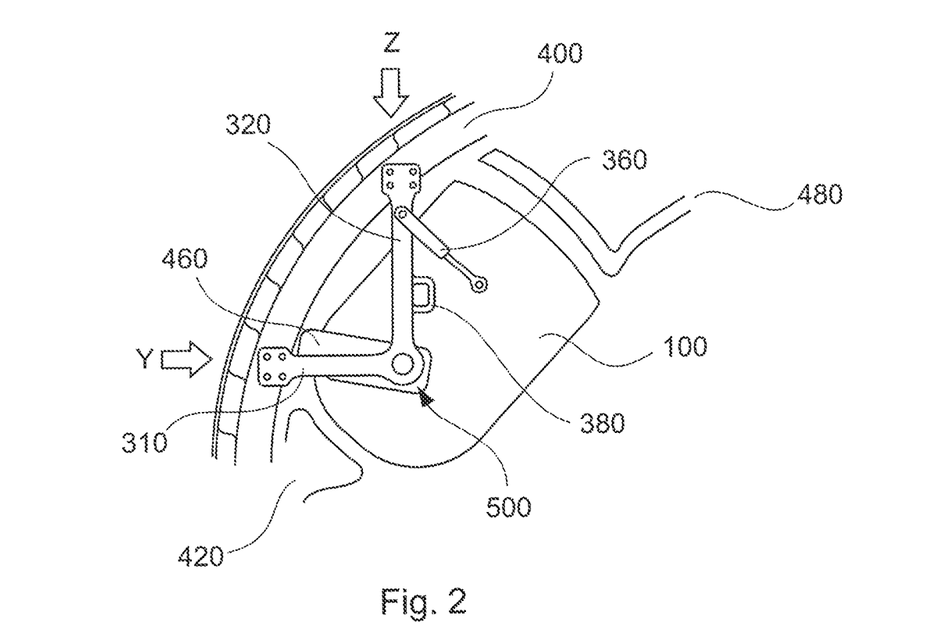
FIG. 2 is a schematic side view of a storage compartment according to an exemplary embodiment of the present disclosure.

FIG. 1 is an isometric view of a storage compartment according to one embodiment of the present disclosure. FIG. 2 is a side view of the storage compartment. One fixing brace 310 extends in the horizontal direction (Y direction) and one fixing brace 320 extends in the vertical direction (Z direction), both fixing braces being fixed to a former 400 of the aircraft primary structure. The aircraft primary structure further comprises stringers 430 (aircraft longitudinal supports), a connecting element 460 being connected by a pull rod as a stabilising element to one of the stringers 430 or to a suitable load application structure of the aircraft primary structure.

FIG. 2 schematically shows a damper 360 and a lock 380. The damper 360 which can be formed as a piston damper can damp a pivoting movement of the storage compartment body 100, the storage compartment body being mounted in such a way that it can rotate about the mounting 500. The lock 380 can lock the storage compartment body 100 in a closed position. FIG. 2 shows the storage compartment body 100 in the closed position. In said position, an outer side of the storage compartment body, together with a covering element 480 and a supply duct 420, form the so-called cabin lining.

FIGS. 3A to 3D illustrate various embodiments according to the present disclosure, the various embodiments differing in the specific formation of the pull rod 450, the connecting element 460 and the fixing brace 320. It should be noted that the elements which perform the same function are denoted by the same reference numerals in different figures.

According to the illustrations in FIGS. 3A to 3D, the pivot mounting 500 is located close to the centre of gravity in the lateral walls of the movable storage compartment body 100. On the structure side, located on a respective frame 400 of the aircraft primary structure, is a largely rigid connection to the pivot bearing 500, namely a horizontal fixing brace 310 (see FIG. 2) for the Y loads, and a vertical fixing brace 320 for the Z loads. The fixing brace 320 comprises a fixing end 322 for connecting to the frame 400 and comprises a mounting end 324 for receiving the mounting 500.

Figure 3A:
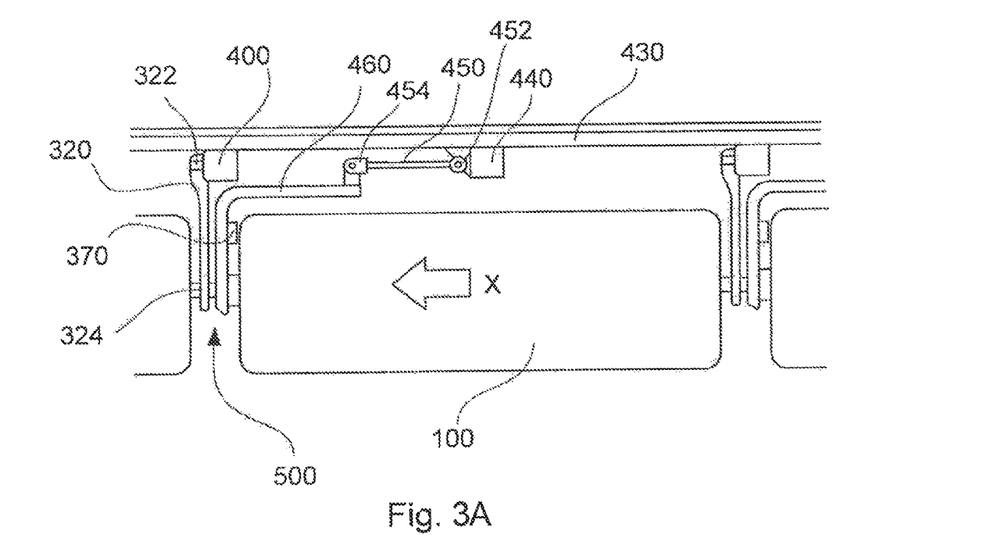
FIG. 3A is a schematic illustration of a storage compartment according to an exemplary embodiment of the present disclosure.

According to the embodiment shown in FIG. 3A, the mounting 500 is also connected to an attachment point 440 on a stringer 430 by a connecting element 460, formed as an angle bracket, and by a pull rod 450. The pull rod 450 comprises a load application end 452 which is rotatably connected to the connection point 440 on the stringer 430, and comprises a connection end 454 which is rotatably connected to one end of the connecting element 460. The non-rigid, rotatable attachment at both ends of the pull rod 460 can ensure that the pull rod 460 can merely be subjected to tension, and that no torques can act on the pull rod.

Both mountings 500 on the storage compartment body 100 can be formed to float in the direction of flight, i.e. in the X direction, starting from specific load conditions, so that as far as possible no bending moments are transferred into the former 400. The structure which is load-bearing in the X direction is the connecting element 460 together with the pull rod 450. The two mountings 500 in the framework relative to the frame 400 only assume the guidance in the Y/Z directions, as well as loads in the X direction which are less than about 3 g.

When greater X loads are transferred into the flexurally rigid connecting element 460 by a front (in the direction of flight) pivot bearing which is formed as a shoulder bearing and when the load application point on the stringer (aircraft longitudinal support) is at a sufficient distance and is in the direct tension direction of the X loads, the system is stabilised by itself when loaded in the X direction and the frame 400 remains largely free of moments.

In addition, when there are relatively great deformations of the system, a contact point in the form of a sliding block 370 between the storage compartment body 100 and the connecting element 460 prevents the connecting element 460 from penetrating inside the storage compartment body 100. In other words, from the moment when the connecting element and the storage compartment body comprise direct physical contact, the entire system is substantially tensioned in accordance with the load.

Figure 3B:
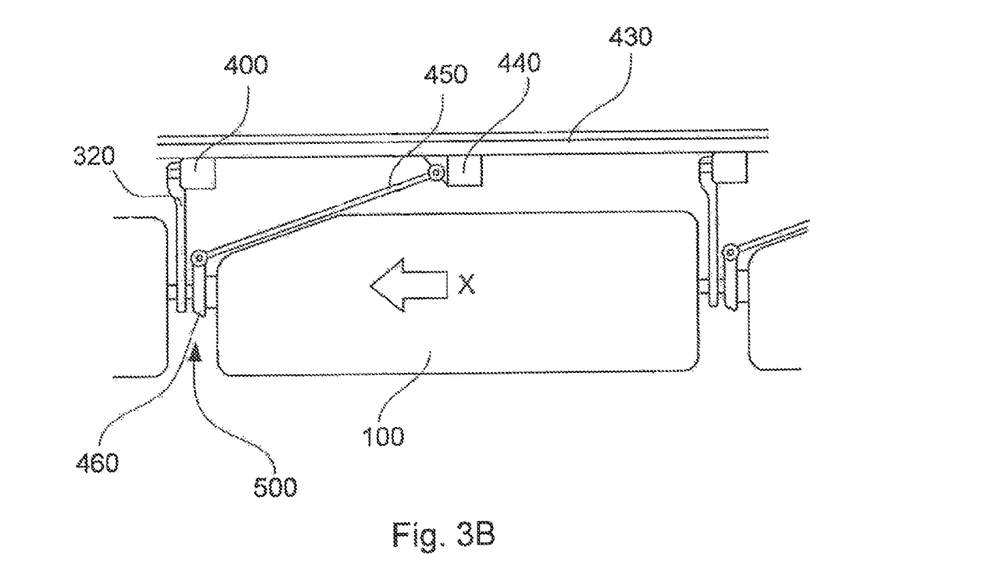
FIG. 3B is a schematic illustration of a storage compartment according to an exemplary embodiment of the present disclosure.

FIG. 3B shows a variant of the embodiment of FIG. 3A. In FIG. 3B, the mounting 500 is substantially connected by a pull rod 450 to an attachment point 440 on a stringer 430, in one example, on a former-stringer clip connection. According to said embodiment, the connecting element 460 is formed in such a way that it receives the mounting 500 and provides, adjacently thereto, a connection with the pull rod.

Figure 3C:
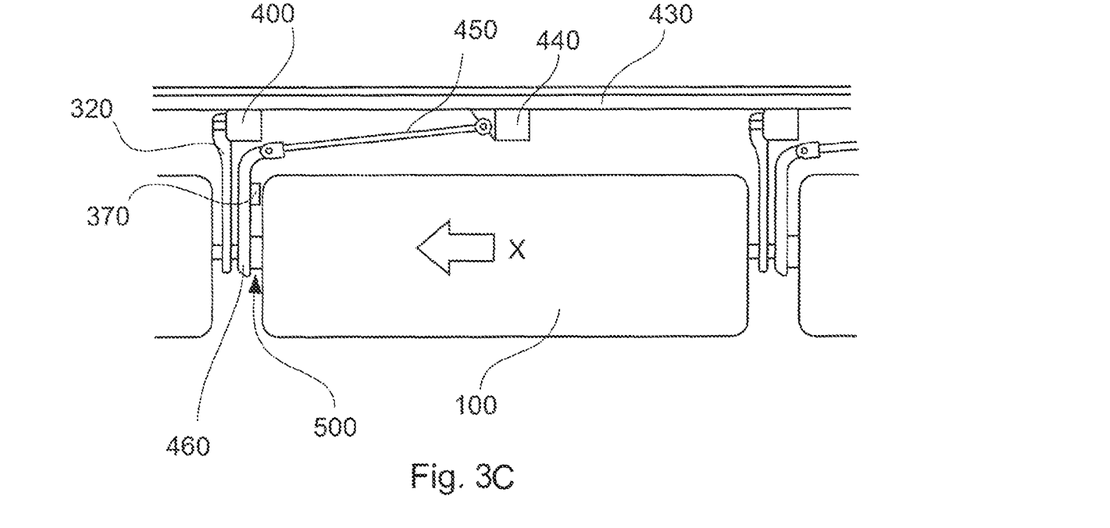
FIG. 3C is a schematic illustration of a storage compartment according to an exemplary embodiment of the present disclosure.

According to the embodiment of FIG. 3C, the connecting element 460 extends beyond an outer edge of the storage compartment body 100. According to said embodiment, the connecting element substantially comprises a transverse portion which extends transversely to the direction of flight. A sliding block 370 is arranged on the connecting element 460 in the vicinity of the outer edge of the storage compartment body 100 and the pull rod 450 is connected to the connecting element such as to ensure a reliable transfer of loads in the X direction onto a stringer 430. Here as well, the loads in the X direction which act on the fixing brace 320 and also on the frame 400, via said brace, are reduced.

Figure 3D:
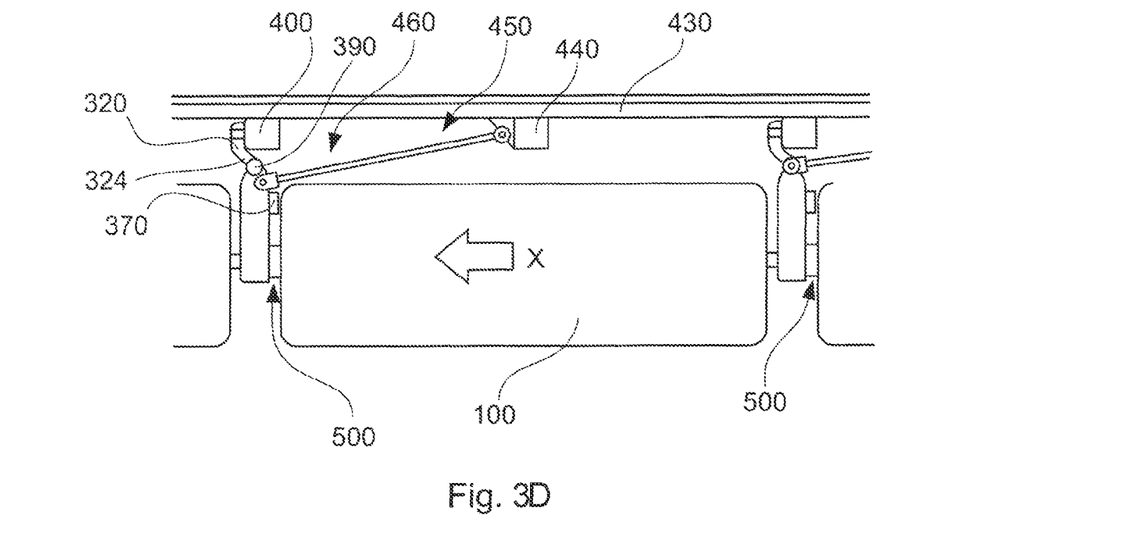
FIG. 3D is a schematic illustration of a storage compartment according to an exemplary embodiment of the present disclosure.

FIG. 3D shows an embodiment of a storage compartment according to the present disclosure, where the mounting end 324 of the fixing brace 320 is connected to the connecting element 460 by an articulation point 390. The fixing brace 320 is thereby no longer directly connected to the mounting 500. As in the other embodiments, a sliding block 370 can also be provided on the connecting element 460 and the connecting end 454 of the pull rod 450 is connected to the connecting element 460 adjacent to the articulation point 390.

In said manner, the frame 400 can be kept free of moments and all the forces acting in the X direction can be absorbed by the pull rod 450 and transferred onto a stringer 430.

Figure 4:
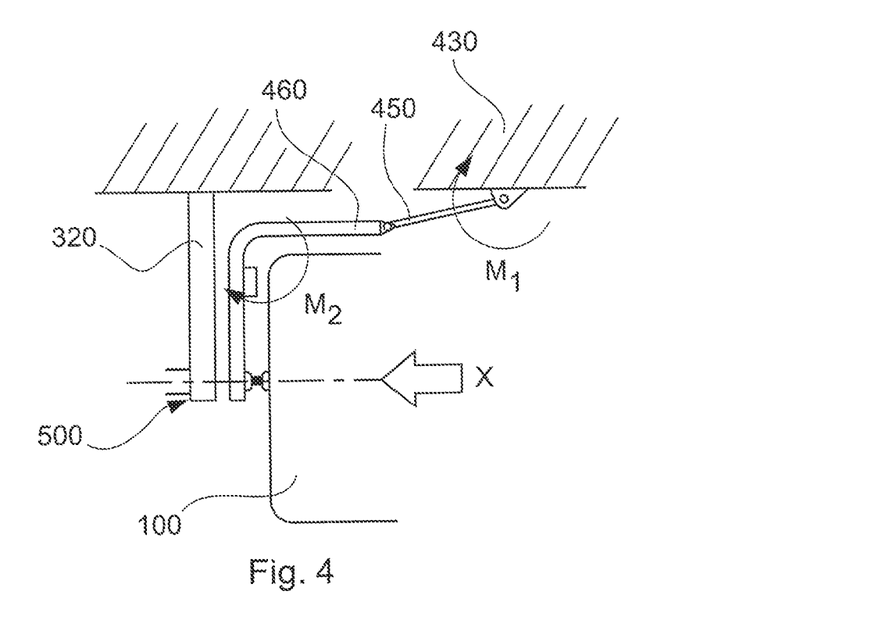
FIG. 4 is a view illustrating the occurrence of moments on a storage compartment according to an exemplary embodiment of the present disclosure.

If a load event occurs, for example an impact event, with a load of about 9 g in the flight direction, i.e. in the X direction, then the system will almost be stabilised by itself due to the arrangement according to the present disclosure, i.e. the moments M2 in the connecting element 460 and the moments M1 in the pull rod substantially cancel each other out, the loads are optimally transferred as tensile forces into the aircraft longitudinal supports, as indicated in FIG. 4. A lightweight support of storage compartments mounted on pivotal points is provided, as would otherwise only be possible with a non-movable storage compartment.

Figure 5:
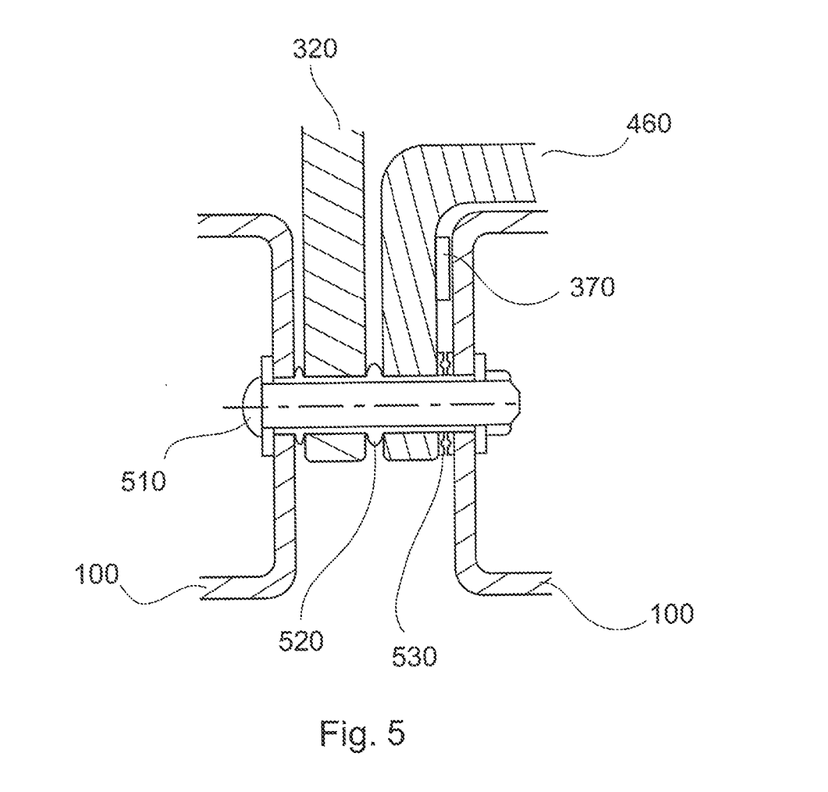
FIG. 5 is a detail of a mounting of a storage compartment according to an exemplary embodiment of the present disclosure.

FIG. 5 shows a sectional view of the mounting 500 in detail. During assembly, the frameworks comprising fixing braces 310, 320 should initially be arranged relative to the formers 400. A storage compartment body can then be mounted via an insertable pin 510. The locking pin engages in a longitudinally slotted bush 520 which is formed as a sliding bearing and which fixes and locks the system in the X direction as soon as the locking pin has been inserted. Due to its particular contour, said bush 520 allows the assembly and the mounting of the components as well as the reception of a shoulder bearing 530 for transferring the X forces. The module can be dismantled and the storage compartment body 100 can be removed as soon as the locking pin comprises been withdrawn. Finally, the connecting element 460 can be connected to an aircraft longitudinal support by a pull rod.

Figure 6:
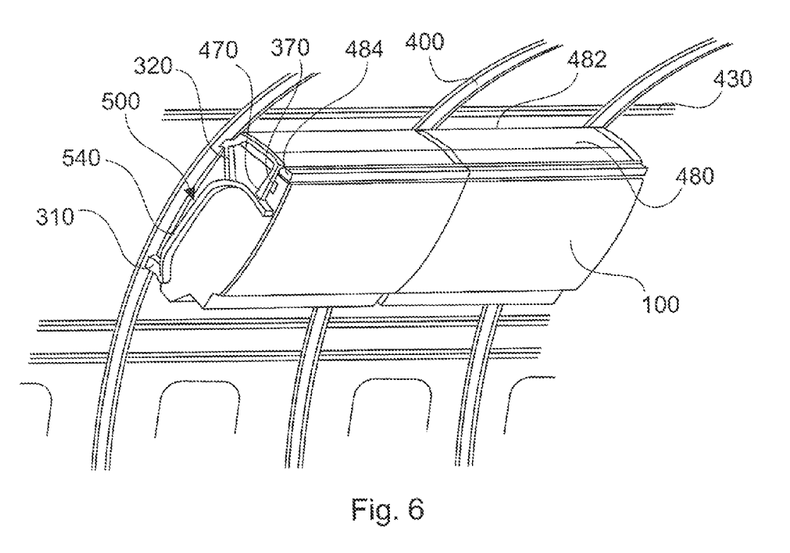
FIG. 6 is an isometric illustration of a storage compartment according to an exemplary embodiment of the present disclosure, in a closed position.
Figure 7:
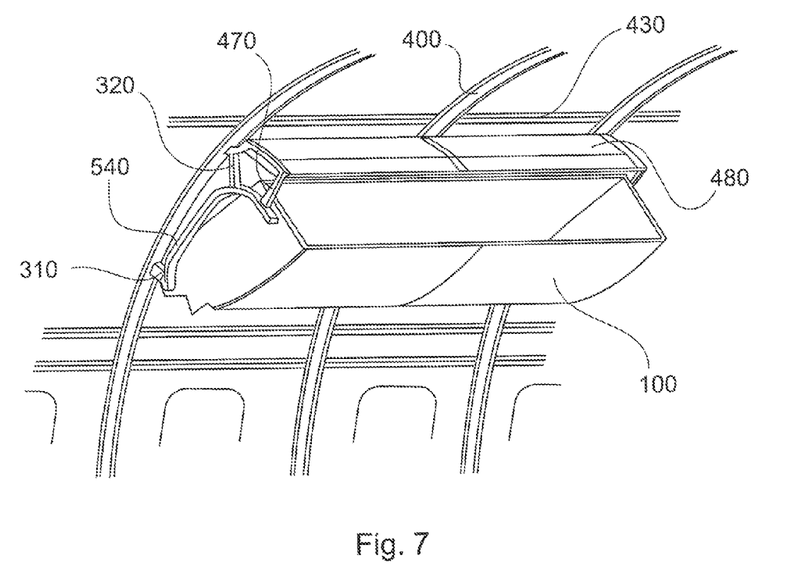
FIG. 7 is an isometric illustration of the storage compartment according to FIG. 6, in an open position.

FIGS. 6 and 7 show a storage compartment according to one embodiment. Unlike the embodiments described above in which a stabilising element, i.e. a pull rod is arranged between the outer wall of the aircraft and the storage compartment body, i.e. behind the storage compartment body, in said embodiment the stabilising element in the form of a push panel 480 is arranged above the storage compartment body 100 and projecting from the outer wall of the aircraft, the outer wall being reinforced by frames 400 and stringers 430.

Fixed to the frames 400 are fixing braces 310 and 320 which are connected to a mounting 500. In said embodiment, the mounting 500 comprises a guide rail 540 into which corresponding mounting elements which are provided on the storage compartment body 100 (not shown) can engage so that the storage compartment body can be moved in a rotational and translational manner between a closed position (FIG. 6) and an open position (FIG. 7).

The panel 480 is fixed to the frames, substantially parallel to the stringers 430. The panel 480 comprises a load application end 482 for fixing to the aircraft primary structure and comprises a connecting end 484, between which loads in the direction of flight in particular can be absorbed by the panel. The connecting end 484 of the panel 480 is connected to the guide rail 540 of the mounting 500 by a connecting element 470. In said manner, a framework is formed by which the entire construction remains substantially vertical to the aircraft primary structure, even in the event of an impact event, in exactly the same manner as a complete outer housing of a conventional movable hat rack, but with a drastically reduced weight. Folding away under a 9 g load is reliably prevented.

It should be noted that construction methods of an aircraft primary structure can also be formed not on the basis of frames and stringers, whereby suitable elements can be used accordingly in an aircraft primary structure of said type.

The panel 480 serves at the same time as a cover for the open side of the storage compartment body in the closed position.

It should be noted that the solution described here is suitable both for rail-guided and for rotatably-mounted storage compartments.

To lock the bin in the closed end position, it is necessary to provide a lock which is integrated into the framework, and said lock can be operated by a central grip via control cables.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A storage compartment for a passenger cabin of an aircraft, comprising:
   a storage compartment body;
   a mounting, and the storage compartment body is connected to the mounting in a pivotable manner;
   a fixing brace including a load application end for connecting to a primary structure of the aircraft and a mounting end for receiving the mounting, and the fixing brace is arranged between an aircraft primary structure and the mounting in such a way that the fixing brace absorbs forces transversely to a direction of flight;
   a stabilizing element including a further load application end for connecting to the primary structure of the aircraft and a connecting end,
   a connecting element including a first end for connecting to the connecting end of the stabilizing element and a second end for receiving the mounting,
   wherein the stabilizing element is arranged between the aircraft primary structure and the first end of the connecting element in such a way that the stabilizing element absorbs forces in the direction of flight, wherein the stabilizing element comprises a panel, and a sliding block, wherein the sliding block is arranged on the connecting element adjacent to an outer edge of the storage compartment body.

2. The storage compartment according to claim 1, wherein the mounting is formed as a fixed bearing on the storage compartment body at a front of the body in the direction of flight.

3. The storage compartment according to claim 1, wherein the mounting comprises a guide rail for guiding the pivoting movement of the storage compartment body.

4. The storage compartment according to claim 1, wherein the stabilizing element comprises a pull rod.

5. The storage compartment according to claim 4, wherein the connecting element comprises a transverse portion and a longitudinal portion, the transverse portion extending outwards from the mounting transversely to the direction of flight and the longitudinal portion extending from the connecting end of the pull rod in the direction of flight.

6. An aircraft comprising,
a passenger cabin;
a storage compartment for the passenger cabin, the storage compartment including:
a mounting;
a storage compartment body connected to the mounting in a pivotable manner;
a fixing brace including a load application end for connecting to a primary structure of the aircraft and a mounting end for receiving the mounting, the fixing brace arranged between an aircraft primary structure and the mounting in such a way that the fixing brace absorbs forces transversely to a direction of flight;
a stabilizing element including a further load application end for connecting to the primary structure of the aircraft and a connecting end, the stabilizing element arranged between the aircraft primary structure and the mounting in such a way that the stabilizing element absorbs forces in the direction of flight;
a connecting element arranged between the connecting end of the stabilizing element and the mounting, the connecting element having an end for receiving the mounting,
wherein the stabilizing element comprises a panel, and
a sliding block arranged adjacent to the outer edge of the storage compartment body so as to transmit forces in the direction of flight from the storage compartment to the connecting element.

7. The aircraft according to claim 6, wherein the mounting is formed as a fixed bearing on the storage compartment body at the front in the direction of flight.

8. The aircraft according to claim 6, wherein the mounting comprises a guide rail for guiding the pivoting movement of the storage compartment body.

9. The aircraft according to claim 6, wherein the stabilizing element comprises a pull rod.

10. The aircraft according to claim 9, wherein the connecting element comprises a transverse portion and a longitudinal portion, the transverse portion extending outwards from the mounting transversely to the direction of flight and the longitudinal portion extending from the connecting end of the pull rod in the direction of flight.

\* \* \* \* \*